United States Patent [19]

Tsumura et al.

[11] Patent Number: 5,299,258
[45] Date of Patent: Mar. 29, 1994

[54] INFORMATION INPUT/OUTPUT CONTROLLER FOR TELEPHONE LINES

[75] Inventors: Mihoji Tsumura; Masato Hata, both of Osaka, Japan

[73] Assignee: Ricos Co., Ltd., Osaka, Japan

[21] Appl. No.: 842,261

[22] Filed: Feb. 27, 1992

[30] Foreign Application Priority Data

Feb. 27, 1991 [JP] Japan .................................. 3-58029

[51] Int. Cl.$^5$ ........................................... H04M 15/00
[52] U.S. Cl. .................................... 379/112; 379/114; 379/121; 379/246
[58] Field of Search ................... 379/66, 88, 112, 114, 379/144, 121, 127, 245, 246, 142, 125, 126; 385/84, 86

[56] References Cited

U.S. PATENT DOCUMENTS

| | | | |
|---|---|---|---|
| 4,750,201 | 6/1988 | Hodgson et al. | 379/144 |
| 4,932,042 | 6/1990 | Baral et al. | 379/245 |
| 4,943,995 | 7/1990 | Daudelin et al. | 379/112 |
| 5,179,584 | 11/1991 | Tsumura | 379/114 |
| 5,193,110 | 10/1990 | Jones et al. | 379/88 |

Primary Examiner—John K. Peng
Assistant Examiner—Daniel J. Wu
Attorney, Agent, or Firm—Thompson, Hine and Flory

[57] ABSTRACT

The invention converts information input from either a charge line or a non-charge line to data form and then stores it in a memory device along with identification data specifying the type of line on which the information was received. It also reads information from the memory device in response to information read requests received by way either of a charge line or of a non-charge line and, when called upon to output said information either to a charge line or to a non-charge line, it inhibits the output of the information to a non-charge line in cases where the line indicated by the aforementioned identification data and the line on which the information read request is received are both non-charge lines. This enables either the sending party or the receiving party of a service, but not both, to be charged for the service while at the same time ensuring that, if the sending party and the receiving party of the service both use a non-charge line, the output of the information will be inhibited in order to preserve the integrity of the charging function. Moreover, if the line indicated by the identification data and the line on which the read request is received are both charge lines, a message is sent to the issuer of the read request to indicate the availability of a non-charge line. This prevents the sending party and the receiving party of the same service from both being charged for the service.

14 Claims, 2 Drawing Sheets

INFORMATION INPUT/OUTPUT CONTROLLER FOR TELEPHONE LINES

BACKGROUND OF THE INVENTION

1. FIELD OF THE INVENTION

The invention relates to an information I/O (input/output) controller for telephone lines which controls the input and output of information by way both of a charge line, which incorporates a charging function, and also of a non-charge line, which does not incorporate a charging function.

2. DESCRIPTION OF THE PRIOR ART

Message services which make use of charge lines incorporating charging functions are already known. A system of this kind calls for the installation of a recording device at a service center which is connected to the telephone exchange by way of a charge line, said telephone exchange also being equipped with a counter to meter the connection time of said charge line. In other words, when a person who wants to send a message calls the service center and records his message on the recording device, a counter meters the sending party's connection time and he is then charged in accordance with the length of his connection time by the addition of a special line-use charge to his regular telephone bill. Similarly, when a person who wants to receive a message calls the service center and listens to a message stored in the recording device, a counter meters the receiving party's connection time and he is also charged in accordance with the length of his connection time.

Although, in the sort of conventional system outlined above, the service provided has normally consisted of a message of some sort, the system can in fact be used for the transfer of many other kinds of data. In other words, if the recording device in the service center is replaced with a memory device, the sending party can use a charge line for the input of information in data form to said memory device while the receiving party can similarly read said information data out of the memory device and download it by way of a charge line.

However, if the information is provided free of charge for the benefit of others by the sending party, for example, then it is not appropriate that the sending party be charged. Similarly, in the case of information such as job advertisements, it is equally inappropriate to charge the receiving party. In this sort of case, the need arises for a charge to be applied either to the sending party or to the receiving party but not to both. One solution to this problem would, of course, be to set up a line which does not incorporate a charging function between the telephone exchange and the service center in addition to the existing charge line. Calls from either the sending party or the receiving party could then be routed via the non-charge line as appropriate.

However, if the calls of the sending party and the receiving party are both routed via the non-charge line, no charge will arise on the service which will consequently fail to meet one of the basic requirements of a functioning business.

SUMMARY OF THE INVENTION

The present invention was devised with the above problem in mind and it is an object of the invention to enable either the sending party or the receiving party of a service, but not both, to be charged for said service while at the same time ensuring that, if the sending party and the receiving party of said service both use a non-charge line, the output of the information will be inhibited in order to preserve the integrity of the charging function. It is a further object of the invention to prevent both a sending party and a receiving party from being charged for the same service. For the purpose of achieving these objects, the present invention aims specifically at the provision of an information I/O controller for telephone lines to which are connected both a charge line, which incorporates a charging function, and also a non-charge line, which does not incorporate a charging function. The invention is designed to enable the storage of data in a memory means, the conversion of information input from either a charge line or a non-charge line to data form and its subsequent storage in said memory means along with identification data specifying the type of line on which said information was received, the reading of information from said memory means in response to information read requests received by way either of a charge line or of a non-charge line and, when called upon to output said information either to a charge line or to a non-charge line, the inhibition of the output of said information to a non-charge line in cases where the line indicated by the aforementioned identification data and the line on which said information read request is received are both non-charge lines. The invention is also designed to enable either the sending party or the receiving party of a service, but not both, to be charged for said service while at the same time ensuring that, if the sending party and the receiving party of said service both use a non-charge line, the output of the information is inhibited in order to preserve the integrity of the charging function.

The present invention is also designed in such a way that, if the line indicated by the identification data and the line on which a read request is received are both charge lines, a message is sent to the originator of the read request to indicate that a non-charge line is available for his use. This prevents the sending party and the receiving party of the same service from both being charged for said service.

DETAILED DESCRIPTION OF THE PREFERRED EMBODIMENTS

Figure 1:
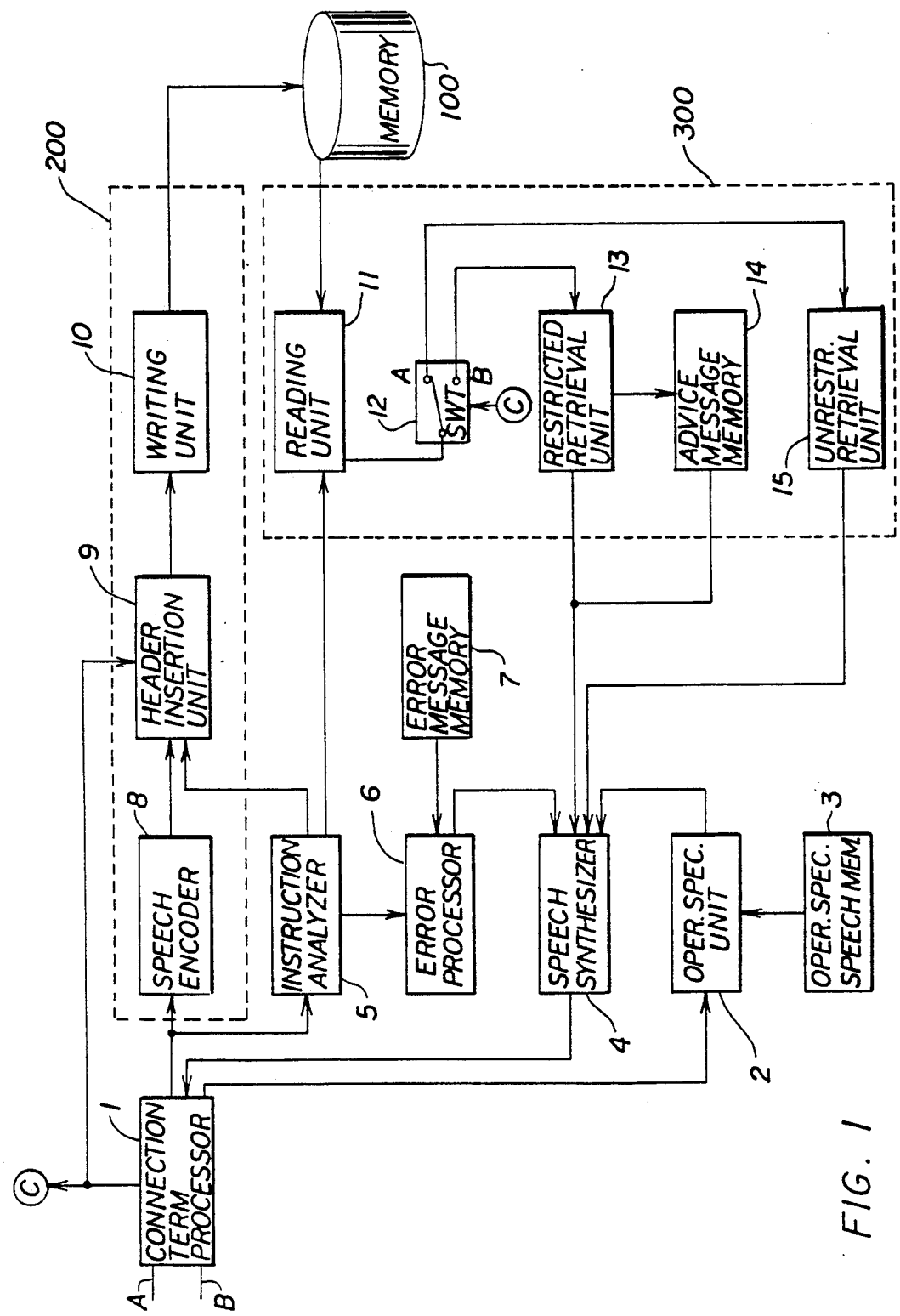
FIG. 1 is a block diagram illustrating the overall configuration of the first preferred embodiment.

There follows a description of the preferred embodiments of the invention by reference to the accompanying drawings. FIG. 1 shows the information I/O controller of the first preferred embodiment. The information I/O controller is installed in a service center and is used to control message services. The service center is linked to a telephone exchange by two telephone lines A,B which are also connected to the information I/O controller. One telephone line A is a charge line incorporating a charging function. The other telephone line B is a non-charge line which does not incorporate a charging function. If either a sending party or a receiving party of data calls up the service center on the charge line A, the caller's connection time is metered by a counter which is also located in the telephone exchange and the caller is subsequently charged in accordance with the metered connection time by the addition of a special line-use charge to his regular telephone bill.

In FIG. 1, 1 is a connection and termination processor which is connected both to the charge line A and to the non-charge line B and which makes and breaks connections between the telephone lines A,B and the information I/O controller while at the same time outputting line signals to indicate which of the telephone lines A,B the information I/O controller is connected to. 100 is a memory means for the storage of data. Said memory means 100 links and stores information data, identification data and ID data. The identification data consists of the aforementioned line signal in data form. The ID data, on the other hand, consists of the data used to specify the information data ID, which is the data form of a personalized identification number agreed on in advance between the sending party and the receiving party.

The aforementioned connection and termination processor 1 is connected to an operation specification unit 2 and a speech synthesizer 4, said speech synthesizer being connected in turn to an operation specification speech memory 3. With this configuration, when an incoming call signal is received from the connection and termination processor 1, the operation specification unit 2 selects the message data which is most appropriate either for the sending party or for the receiving party from the operation specification speech memory 3, converts said message data to speech sounds using the speech synthesizer 4 and then outputs said speech sounds by way of the connection and termination processor 1 to the telephone lines A,B. The type of message under consideration here could include, for example, "Use the buttons to input your personal identification number" or "When the tone stops, state your message". Depending on the type of message received, the caller will then input either his personal identification number or else a message of his own.

The aforementioned connection and termination processor 1 is also connected to an instruction analyzer 5, which converts the caller's personal identification number input from the connection and termination processor 1 to binary coded ID data. The instruction analyzer 5 is connected to an error processor 6, the output of said error processor 6 being input to the aforementioned speech synthesizer 4. The error processor 6 is in turn connected to an error message memory 7. With this configuration, if the message analyzer 5 fails to create appropriate ID data, the error processor 6 selects the appropriate message data from the error message memory 7, converts said error message data to speech sounds using the speech synthesizer 4 and outputs it to the telephone lines A,B by way of the connection and termination processor 1.

There now follows an explanation of the memory related processing of information received from the sending party. The aforementioned connection and termination processor 1 is connected to a speech encoder 8 which converts aural message signals from the sending party into binary coded information data. 9 is a header insertion unit which accepts the input of line signals from the connection and termination processor 1 and information data and ID data from the speech encoder 8 and the instruction analyzer 5 respectively, and then inserts said identification data and said ID data as appropriate at the head of said information data. The header insertion unit 9 is in turn connected to a writing unit 10 which writes information data along with its concomitant identification and ID data into the memory means 100.

There now follows an explanation of the processing operations involved in the reading of information in accordance with a read request input by a receiving party. The aforementioned memory means 100 is connected to a reading unit 11 which accepts input of an ID signal from the instruction analyzer 5 and then reads out the information data and the identification data which corresponds to the ID signal input by the receiving party.

The aforementioned reading unit 11 is also connected to a switching means 12 which switches between contact A and contact B depending on whether the line signal input from the connection and termination processor 1 is a line A signal or a line B signal. Contact A is connected to an unrestricted retrieval unit 15, the output of which is input to the speech synthesizer 4. Contact B, on the other hand, is connected to a restricted retrieval unit 13, one output of which is connected to the speech synthesizer 4 by way of an advice message memory 14, the other output being connected directly to the speech synthesizer 4. In other words, if the receiving party issues a read request for information data by way of the charge line A, the switching means 12 will switch to contact A and the information data subsequently read out by the reading unit 11 will be output to the speech synthesizer 4 by the unrestricted retrieval unit 15. The speech synthesizer 4 will in turn convert the information data to speech sounds for output to the charge line A and subsequent transmission to the receiving party.

If, on the other hand, the receiving party issues a read request for information data by way of the non-charge line B, the switching means 12 will switch to contact B and the information data subsequently read out by the reading unit 11 will be output to the restricted retrieval unit 13. The restricted retrieval unit 13 first determines whether the identification data at the head of said information data is A or B and, in cases where said identification data is A, it outputs the information data to the speech synthesizer 4 where it is converted to speech sounds and output to the charge line A for subsequent transmission to the receiving party. If the identification data is B, on the other hand, its output is inhibited and an instruction is sent instead to the advice message memory 14 instructing it to output its advice message data to the speech synthesizer 4 where it is converted to speech sounds, output to the non-charge line and subsequently transmitted to the receiving party. The advice message which is output instructs the receiving party to "Use the charge line A".

In the configuration outlined above, the speech encoder 8, header insertion unit 9 and the writing unit 10 together constitute the input means 200, which converts information input from either the charge line A or the non-charge line B to data format and writes it into the aforementioned memory means 100 along with identification data which specifies which of the telephone lines was used. The reading unit 11, the switching means 12, the restricted retrieval unit 13, the advice message memory 14 and the unrestricted retrieval unit 15 together constitute the output means 300, which responds to the receipt of an information data read request from either the charge line A or from the non-charge line B by reading the required information data out of the aforementioned memory means 100 and by outputting it either to the charge line A or to the non-charge line B and, in cases where both the line indicated by the identification data and also the line on which the read request was received is the non-charge line B, by inhibiting output of the recorded information to the non-charge line B. Thus, in the first preferred embodiment outlined above, since both the sending party and the receiving party are charged only when they use the charge line A, it is possible to ensure that only the sending party or the receiving party, but not both, are charged for the same service. Similarly, in cases where the line indicated by the identification data which has been read out and the line on which the read request was received are both the non-charge line B, the output means inhibits output of the recorded information to the non-charge line B, thereby effectively preventing the receiving party from receiving the information he has requested in cases where the sending party and the receiving party have both used the non-charge line. In this way the integrity of the charging function is preserved.

Figure 2:
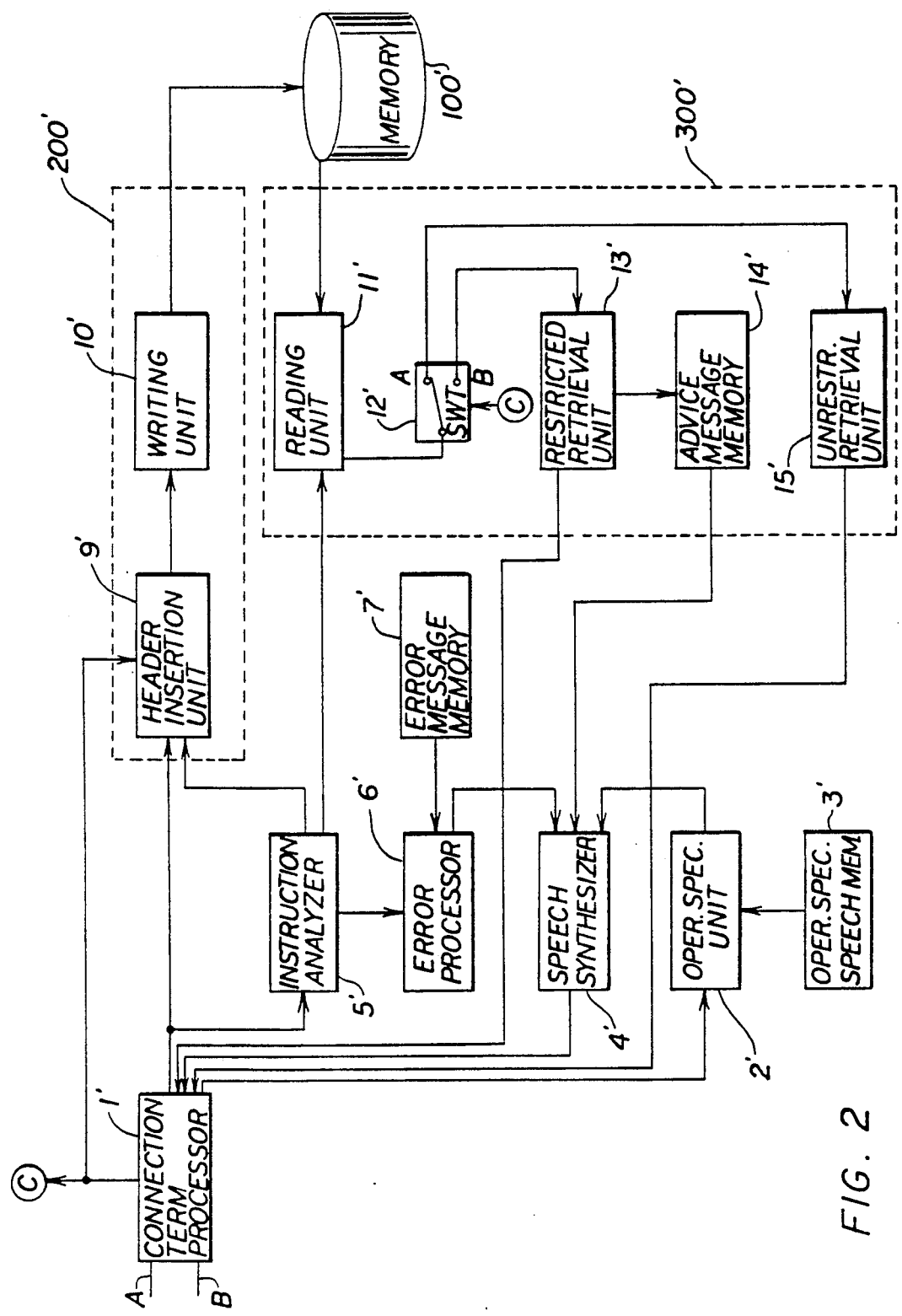
FIG. 2 is a block diagram illustrating the overall configuration of the second preferred embodiment.

There now follows a description of the second preferred embodiment with reference to FIG. 2. Whereas the information I/O controller of the first preferred embodiment was used for message services, the information I/O controller of the second preferred embodiment is used for the sorts of services that might accompany a game software service. Both the sending party and the receiving party are thus assumed to have use of their own personal computer (hereafter "PC") which is connected to a telephone line. While the basic design of the information I/O controller of the second preferred embodiment is essentially the same as that outlined in connection with the first preferred embodiment above, the block configuration in the second case is slightly different from that of the first since the I/O information is now binary data and not speech sounds. For this reason, blocks shown in FIG. 2 which have the same sort of function as the comparable blocks 1 to 15 and 100, 200 and 300 in the first preferred embodiment have been assigned the same number but with a (') suffixed to it. The sorts of messages stored in the operation specification speech memory 3' would be messages such as "Use the buttons to input your personal identification number" and "Input your next instruction". Depending on the type of message received, the caller will then input either his personal identification number or else an appropriate instruction. There is, moreover, no block corresponding to the speech encoder 8 of the first preferred embodiment with the result that the output of the connection and termination processor 1' is input directly to the header insertion unit 9'. The output of the restricted retrieval unit 13' and the output of the unrestricted retrieval unit 15' are both input directly to the connection and termination processor 1'. Consequently, whereas in the first preferred embodiment outlined above the speech encoder 8, the header insertion unit 9 and the writing unit 10 together constitute the input means 200, the input means 200' of the second preferred embodiment comprises only a header insertion unit 9' and a writing unit 10'.

There now follows a description of the operation of a complete system including an information I/O controller. First, it is assumed that the user of a particular piece of game software normally accesses and downloads the software in question to his PC from a service center other than the one referred to above. The user then uses his PC to implement the downloaded software and play the game. During the course of the game the user will, of course, be required to input data of his own but the system is designed in such a way that, when he finishes playing the game and switches off his PC, both the basic software and also the data that he has input himself are erased. The user is thus prevented from carrying on with his game at a later date. However, it may well be that in the case of the basic software referred to above, the whole process from the start of the program to the end may take a long time and, if account is also taken of the large number of different branches in the program, it could in fact take several weeks or even months for any one user to play the game right through to the end. The problem, however, is that, even after he has downloaded all the software to his PC, the average user is not normally in a position to play the game for more than a few hours at a time. He is thus unable to execute the program right through to the end and, when he switches off his PC, he will automatically erase not only the data he has input himself but also the basic software referred to above. Thus, when he wants to play the game again and downloads the basic software from the service center, he is unable to carry on from where he left off on the previous occasion but has to start the program again from the beginning. Under these circumstances, much of the interest of the game is inevitably lost.

In the second preferred embodiment, however, whenever the user has temporarily finished playing the game, he is then able to access the service center shown in FIG. 2 by way of the non-charge line B and to store free of charge both the basic software of the game and also the data he himself has input up to that point. The system is configured in such a way that any unspecified user can later access the service center in FIG. 2 by way of the charge line A and, for a charge, download the basic software along with the data previously entered by the user himself. It is therefore possible, using this type of system configuration, to download the basic software in mid-process and to resume the game from part-way through. When the user has again finished temporarily with the basic software plus added data which he downloaded, he can once again access the service center in FIG. 2 by way of the non-charge line B as explained above and store his game without charge until he is ready to play again.

The basic operations involved in the processes outlined above will now be described by reference to FIG. 2. When the user has finished playing the game, he will first of all access the service center in FIG. 2 by way of one of the telephone lines A,B after which he will enter a command stored in his own PC in order to upload the basic software plus newly added data by way of the aforementioned connection and termination processor 1', the header insertion unit 9' and the writing unit 10' to the memory means 100' into which it will be written in along with its identification data and ID data.

At a later date, if the user originates a read request for the basic software plus added data using the charge line A, the switching means 12' will switch to contact A and the basic software plus added data read out by the reading unit 11' will be output by the unrestricted retrieval unit 15' to the charge line A and subsequently transmitted to the receiving party.

If, on the other hand, the user issues a read request for the basic software plus added data using the non-charge line B, the switching means 12' will switch to contact B and the basic software plus added data read out by the reading unit 11' will be output to the restricted retrieval unit 13'. The restricted retrieval unit 13' will then determine whether the identification data linked to said basic software plus added data is A or B and, if it proves to be A, then it will output said basic software plus added data to the charge line A for subsequent transmission to the user. If, on the other hand, the identification data proves to be B, then the restricted retrieval unit 13' will inhibit the output of said basic software plus added data while at the same time issuing an instruction to the advice message memory 14' to output the appropriate advice message data to the speech synthesizer 4' where it will be converted to the corresponding advice message in speech form and then output to the non-charge line B for transmission to the user. The advice message is "Please use the charge line A". In this way it is possible, using the second preferred embodiment of the invention described above, to charge either the sending party or the receiving party, but not both, for the transmission of the basic software plus added data.

If, under the sort of circumstances outlined above, the line indicated by the basic software plus added data read out by the reading unit 11' and the line on which the read request was received are both the non-charge line B, then the output means 300' will inhibit output of said basic software plus added data to the non-charge line B. Thus, in cases where both the sending party and the receiving party of a service have both used the non-charge line, the receiving party is prevented from receiving the service by the forced inhibition of the transmission and the integrity of the charging function is in this way preserved.

Another important point is that, while the non-charge line B does not incorporate a charging function with the result that there is no "additional special line-use charge to add to the user's regular telephone bill", the user is nevertheless charged the normal telephone charge in respect of his use of the line. The normal telephone charge may be charged in either of two ways. The first involves charging either the sending party or the receiving party of the service and the second involves charging the service center itself. It should also be noted that although, for the purpose of this explanation, we have assumed the connection of just one charge line A and one non-charge line B to the information I/O controller, it would be equally acceptable to connect a plurality of charge lines and a plurality of non-charge lines to said controller.

In the second preferred embodiment described above, it was assumed that ID data would be established and that basic software plus added data would only be transferred after matching with said ID data. It would be equally possible, however, to dispense with the establishment of ID data and to transfer basic software plus added data to any nonspecified user.

Moreover, in the examples of both the preferred embodiments outlined above, it was assumed that in cases where both the sending party and the receiving party of a service made use of the charge line A, both would be charged for the service. It would be equally possible, however, in this sort of case for the service center to advise the receiving party of the service that the non-charge line B is available for use. In order to configure a system in this way, it would be necessary to incorporate an advice means whereby, when the line indicated by the identification data and the line on which the read request is received are both charge lines, an advice is transmitted to the receiving party who has originated the read request to advise him that a non-charge line is available. In the first preferred embodiment described above, said advice means would receive output from the aforementioned unrestricted retrieval unit 15 and then output the appropriate advice data to the speech synthesizer 4. The final advice would be "The non-charge line B is available for use". Similarly in the case of the second preferred embodiment described above, the advice means would receive output from the unrestricted retrieval unit 15' and then output the appropriate advice data to the speech synthesizer 4'. In this way it would be possible to avoid charging both the sending party and the receiving party for the same service.

What is claimed is:

1. An information input/output controller for telephone lines to which is connected a charge line, which incorporates a charging function, and a non-charge line, which does not incorporate a charging function, and which comprises
    (a) a memory means for the storage of data,
    (b) an input means which converts information input either from said charge line or from said non-charge line to a data format and then writes said data into said memory means along with identification data specifying the line on which said information was received, and
    (c) an output means which, on receipt of an information data read request from either said charge line or said non-charge line, reads the requested information data from said memory means and outputs it to said charge line or said non-charge line, while at the same time restricting the output of said information data to said non-charge line in cases where the line indicated by the identification data and the line on which the read request was received are in both cases said non-charge line.

2. The information input/output controller according to claim 1 in which the aforementioned information data is linked both with identification data specifying the telephone line used by a sending party and also with ID specification data and is then stored in said memory means, and in which said output means reads out the information data which corresponds to the ID data input by a receiving party.

3. The information input/output controller according to claim 2 in which said identification data and said ID specification data are both inserted at the head of said information data.

4. The information input/output controller according to claim 2 in which the ID specification data is a personal identification number agreed in advance between the sending party and the receiving party.

5. The information input/output controller according to claim 2 which further comprises
    an error message output means which outputs an error message to the telephone line whenever there is a failure to create ID specification data.

6. The information input/output controller according to claim 1 which further comprises
    a message output means which outputs a message to the telephone line whenever it receives an incoming signal from a sending party or a receiving party.

7. The information input/output controller according to claim 1 which further comprises
    an advice output means which, whenever the aforementioned output means inhibits the output of information to the non-charge line, outputs an advice message to said non-charge line.

8. The information input/output controller according to claim 1 in which the aforementioned telephone lines are connected to personal computers installed on the premises of a sending party and a receiving party.

9. The information input/output controller according to claim 1 in which the aforementioned information data consists of a spoken message.

10. The information input/output controller according to claim 1 in which said information data consists both of basic game software, which is configured such that, in its downloaded condition, it will be erased if a termination operation is carried out, and also of added data which has been input by a user.

11. The information input/output controller according to claim 10 in which said basic software plus added data is configured such that, when the sending party accesses said input means by way of said telephone line, it can be written into said memory means without being erased.

12. The information input/output controller according to claim 1 which is connected both to a plurality of charge lines and also to a plurality of non-charge lines.

13. The information input/output controller according to claim 1 which further comprises
an advice means which, whenever the line indicated by the identification data and the line on which a read request has been received are both charge lines, outputs a message to advise a receiving party who has originated the read request that a non-charge line is available for his use.

14. The information input/output controller according to claim 1 in which said information data consists of a written message.

* * * * *